(12) United States Patent
Benward et al.

(10) Patent No.: US 10,337,893 B2
(45) Date of Patent: Jul. 2, 2019

(54) OPTICALLY POWERED SENSOR CALIBRATION DATA STORAGE MODULE

(71) Applicant: Parker-Hannifin Corporation, Cleveland, OH (US)

(72) Inventors: Robert Benward, Huntington Station, NY (US); Lewis John Boyd, Bath (GB)

(73) Assignee: Parker-Hannifin Corporation, Cleveland, OH (US)

(*) Notice: Subject to any disclaimer, the term of this patent is extended or adjusted under 35 U.S.C. 154(b) by 0 days.

(21) Appl. No.: 15/866,499

(22) Filed: Jan. 10, 2018

(65) Prior Publication Data
US 2018/0195884 A1 Jul. 12, 2018

Related U.S. Application Data

(60) Provisional application No. 62/444,462, filed on Jan. 10, 2017.

(51) Int. Cl.
G01D 5/353 (2006.01)
G06K 19/07 (2006.01)
G01M 11/00 (2006.01)
G07C 5/08 (2006.01)
G01M 5/00 (2006.01)
(Continued)

(52) U.S. Cl.
CPC ...... *G01D 5/35387* (2013.01); *G01M 5/0091* (2013.01); *G01M 11/30* (2013.01); *G06K 19/0727* (2013.01); *G07C 5/0825* (2013.01); *B64D 37/02* (2013.01); *B64D 2045/0085* (2013.01); *G01B 2290/45* (2013.01)

(58) Field of Classification Search
CPC ............ B64D 2045/0085; B64D 37/02; G01B 2290/45; G01D 5/35387; G01M 11/30; G01M 5/0091; G06K 19/0727; G07C 5/0825
See application file for complete search history.

(56) References Cited

U.S. PATENT DOCUMENTS

| 6,600,972 B2 * | 7/2003 | Morrison | ............ G01F 23/0069 700/22 |
| 7,512,291 B2 | 3/2009 | Mendoza | |
| 9,212,968 B1 | 12/2015 | Smith et al. | |

(Continued)

*Primary Examiner* — Nader Bolourchi
(74) *Attorney, Agent, or Firm* — Renner, Otto, Boisselle & Sklar, LLP

(57) ABSTRACT

An aircraft measurement system includes an interrogator and an optical sensor assembly. The optical sensor assembly includes an optical sensor connected along a sensor path to the interrogator, a data storage device, and a control circuit connected along a power path to the interrogator. The sensor assembly also includes an opto-electric device for converting an optical signal to an electric current, connected along the power path between the interrogator and the control circuit, to power the data storage component through the control circuit, and a transmitter operationally connected to the control circuit and connected along a data path to the interrogator, to provide operational data along the data path to the interrogator. The data storage component provides operational data to the interrogator across the data path, and the interrogator is configured to receive sensor data from the sensor across the sensor path.

21 Claims, 3 Drawing Sheets

(51) Int. Cl.
*B64D 45/00* (2006.01)
*B64D 37/02* (2006.01)

(56) References Cited

U.S. PATENT DOCUMENTS

| | | |
|---|---|---|
| 2015/0100253 A1* | 4/2015 | Austerlitz ............... G01F 22/00 |
| | | 702/55 |
| 2015/0276456 A1* | 10/2015 | Boyd ...................... G01F 23/14 |
| | | 73/114.54 |
| 2016/0138958 A1 | 5/2016 | Truong et al. |
| 2016/0266325 A1* | 9/2016 | Austerlitz ............ G02B 6/3552 |
| 2016/0275982 A1* | 9/2016 | Austerlitz ................ G06K 7/00 |
| 2018/0052029 A1* | 2/2018 | Carralero ............... G01F 23/14 |

\* cited by examiner

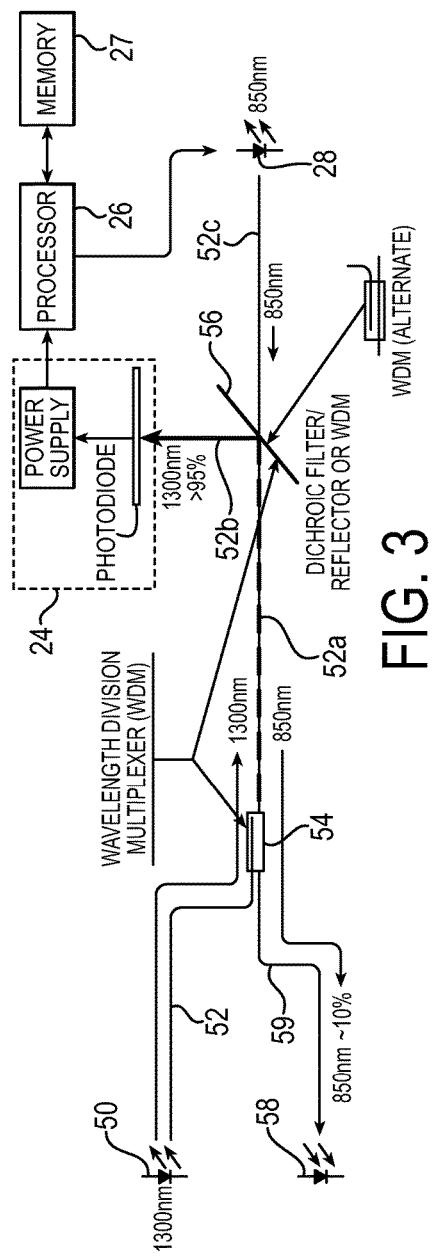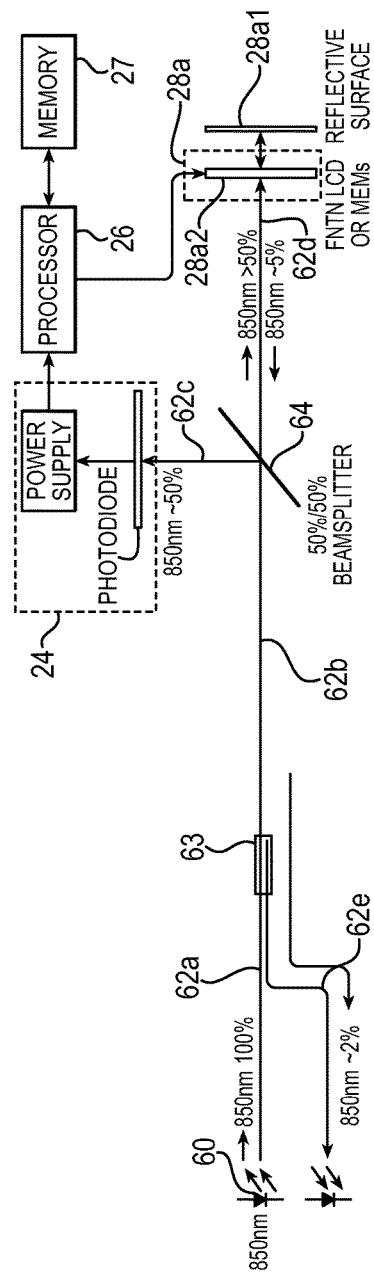

OPTICALLY POWERED SENSOR CALIBRATION DATA STORAGE MODULE

This application claims priority of U.S. Provisional Patent Application No. 62/444,462 filed Jan. 10, 2017, which is hereby incorporated herein by reference.

TECHNICAL FIELD

The present invention relates generally to passive optical sensors for Aerospace fuel systems applications and, more particularly, to the storage of calibration data associated with an optical sensor and the ability to access this data remotely using only optical energy.

BACKGROUND INFORMATION

As a part of the development of passive optical pressure and temperature sensors for Aerospace fuel systems applications, an issue was identified that relates to calibration data for the sensors. More particularly, sensors require calibration data to be stored and used to convert the raw measurands into meaningful pressure and temperature values to be used in the fuel gauging system. These calibration data are stored on an optical interrogator, which is remotely located from the sensors themselves. This potentially leads to an issue with interchangeability, as when a sensor is removed and replaced with a different sensor (as may be the case say in a routine line maintenance operation), the calibration data associated with the new sensor must be uploaded onto the interrogator.

In the context of an aircraft fuel gauging system, such an operation is not acceptable to the end customer, as it represents a significant maintenance overhead and a potential cause of system mis-operation if the incorrect data is loaded. It is preferable that any sensor be "plug and play"—that is, once a new sensor is plugged into the interrogator, its data is automatically properly calibrated.

Such an approach is typically taken with high accuracy electrical sensors, where sensor calibration data can be stored locally on the sensor itself, and applied to the raw measurands directly by the sensor in some local processing capability, so that the data output on the electrical data link is immediately usable to the end system. Such systems, however, rely on electrical power provided by a power source to store and retrieve data.

In a fuel tank application, the amount of electrical power must be kept below prescribed levels to prevent the electrical power from acting as a source (electrical spark) that may ignite the fuel/fuel vapor. Such low power levels are generally insufficient to operate the storage devices that store the calibration data. Therefore, such conventional systems are unsatisfactory in an aircraft fuel tank environment.

Therefore, there is a need for an equivalent system for passive optical sensors which allows their interfacing electronics (the interrogator) to automatically read any associated calibration data upon start up, and automatically apply said calibration data to the raw measurands, without the need for any additional manual step during installation.

SUMMARY OF THE INVENTION

An apparatus and system in accordance with the present invention enable operational data, such as calibration data, identification data, configuration data, or the like, to be locally stored on an optical sensor and retrievable from the sensor without the need for an external electric power connection to the sensor. More particularly, electric power is harvested from an optical signal provided to the optical sensor. In one embodiment, the electric power is harvested from an optical signal used to interrogate the sensor, while in another embodiment electric power may be harvested from an optical signal separate from the interrogation signal.

Since electric power is harvested from an optical signal, electrical devices may be used as a data storage device in the sensor, without the need for an external electric power connection to the sensor. Such electrical devices include, for example, electrically erasable programmable read only memory (EEPROM) and Ferroelectric random access memory (FRAM) devices, and the like.

Electric power may be harvested from the optical signal using an opto-electric device such as, for example, a photodiode, a light emitting diode, or the like. While the instantaneous power harvested from the optical signal may be low, the power can be accumulated over time until a sufficient amount of power has been harvested to operate the electrical device. To this end, an energy storage device may be operatively coupled to the opto-electric device to accumulate energy over time. Once the stored energy reaches a prescribed level, it can be used to apply electric power to the data storage device and associated circuitry to retrieve the calibration (or other) data.

According to one aspect of the invention, an optical sensor assembly includes: an optical sensor for obtaining sensor data corresponding to a characteristic to be monitored; a data storage device configured to store operation data; an opto-electric device for converting an input optical signal to an electric current; a control circuit operationally connected the opto-electric device and to the data storage device; and a transmitter operationally connected to the control circuit to optically output operation data stored in the data storage device; wherein the data storage device is powered from the opto-electric device, and optically outputs operation data for manipulation of the sensor data by an external device.

Optionally, the optical sensor comprises a passive optical sensor.

Optionally, the sensor includes an input optical path for receiving optical data from an external device, and at least one of a dichrotic filter, a reflector, a wavelength division multiplexor (WDM), or a beamsplitter arranged between the opto-electric device and the input optical path.

Optionally, the transmitter comprises a light emitting diode.

Optionally, the transmitter comprises a modulated reflective device.

Optionally, the modulated reflective device comprises a liquid crystal display or a micro-electro mechanical system (MEMS) scanning mirror.

Optionally, the opto-electric device comprises at least one of a light emitting diode or a photodiode.

Optionally, the optical sensor assembly further comprises a housing, and at least one of the optical sensor, the data storage device, the control circuit, the opto-electric device, or the transmitter are arranged within the housing.

Optionally, the housing is a hermetically sealed housing.

Optionally, the sensor includes an energy storage device configured to store electric energy harvested by the opto-electric device.

Optionally, the sensor includes circuitry configured to limit energy stored in the energy storage device below a predetermined threshold level.

According to another aspect of the invention, a measurement system for an aircraft includes: an interrogator; and the optical sensor assembly dscribed herein remotely connected to the interrogator.

Optionally, the system includes a single fiber optic connection between the interrogator and the optical sensor assembly, wherein both the operation data and the sensor data are communicated over the single fiber optic connection.

Optionally, the system includes a plurality of fiber optic connections between the interrogator and the optical sensor assembly, wherein the operation data is communicated over a first fiber optic connection of the plurality of fiber optic connections and the sensor data is communicated over a second fiber optic connection of the plurality of fiber optic connections.

Optionally, the optical sensor assembly utilizes a first wavelength of light to communicate the sensor data from the optical sensor assembly to the interrogator, and a second wavelength of light to communicate the operation data from the optical sensor assembly to the interrogator, the second wavelength being different from the first wavelength.

Optionally, the interrogator is configured to transmit an optical signal to the optical sensor assembly at a first wavelength, and the optical sensor assembly is configured to transmit an optical signal to the interrogator at a second wavelength different from the first wavelength.

Optionally, the first wavelength comprises approximately 1300 nanometers, and the second wavelength comprises approximately 850 nanometers.

Optionally, the interrogator is configured to transmit an optical signal in the visible spectrum.

Optionally, the interrogator is configured to transmit the optical signal to the optical sensor assembly in a purple part of the visible spectrum of light, and the opto-electric device comprises a blue-light LED operative to convert the optical power to electric power.

Optionally, the optical sensor assembly is configured to use the blue-light LED to transmit data back to the interrogator.

Optionally, the optical sensor assembly is configured to transmit data to the interrogator over the red spectrum of light.

The foregoing and other features of the invention are hereinafter fully described and particularly pointed out in the claims, the following description and the annexed drawings setting forth in detail one or more illustrative embodiments of the invention. These embodiments, however, are but a few of the various ways in which the principles of the invention can be employed. Other objects, advantages and features of the invention will become apparent from the following detailed description of the invention when considered in conjunction with the drawings.

BRIEF DESCRIPTION OF THE DRAWINGS

FIG. 3 is a schematic diagram illustrating an exemplary measurement system in accordance with the invention in which optical data is received at a first wavelength and transmitted at a second, different wavelength.

FIG. 4 is a schematic diagram illustrating an exemplary measurement system in accordance with the invention in which a switching device is used to generate an optical signal for transmission back to the interrogator.

DETAILED DESCRIPTION

Figure 1:
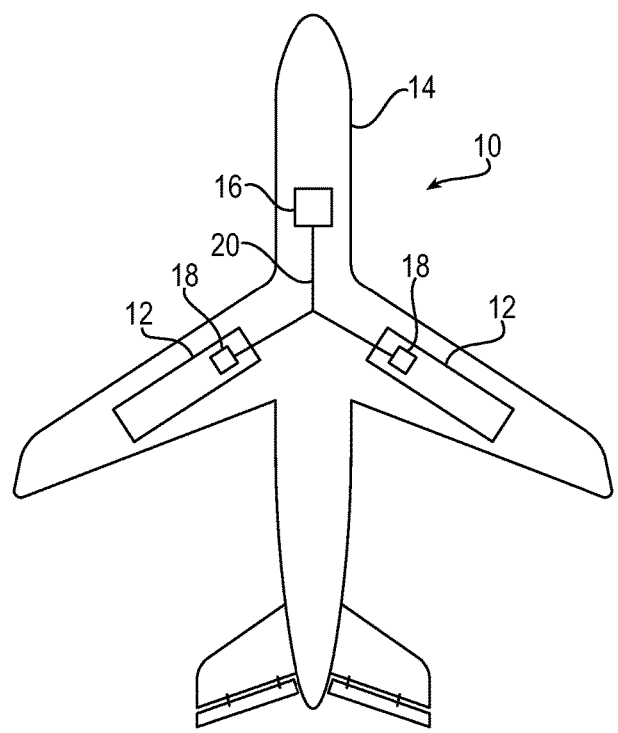
FIG. 1 is a schematic diagram of an aircraft that includes a measurement system in accordance with the present invention.

The present invention will be described in the context of an aircraft and, in particular, in the context of a fuel gauging system for an aircraft fuel tank. It will be appreciated, however, that the principles of the invention are applicable where it is desired to eliminate electric power connections to a remotely located optical sensor. In particular, aspects of the invention are applicable to any passive optical sensing device that may be used, for example, for measuring pressure, temperature, strain, density, fluid level, etc., including gas turbine pressure sensors, oil and gas field exploration sensors, chemical processing sensors, etc. The sensing may be achieved using any number of passive optical measurement techniques, including but not limited to Fibre Bragg Gratings, or other grating types, e.g., Fabry-Perot Interferometers, Mach-Zender Interferometers.

A passive optical sensor system in accordance with the present invention enables operational data, such as calibration data, configuration data, identification data, or the like, to be stored via one or more electrical devices of a passive optical sensor without an external electrical connection to the optical sensor. In this regard, electric power is harvested from an optical signal that is provided to the passive optical sensor by a remotely located device. The optical signal may be, for example, a communication signal transmitted by an interrogator of an optical sensor system, the signal being used to request data from the passive optical sensor. Alternatively or additionally, power may be harvested from an optical signal different from the communication signal, or from a combination of the two signals.

To harvest electric power from the optical signal, the optical signal can at least partially be provided to an opto-electric device (e.g., a photo diode or the like) that converts optical energy into electrical energy. If necessary to meet the power requirements of a specific application, the converted energy can be accumulated over time until the accumulated energy reaches a sufficient level to power an electronic memory device and associated circuitry of the optical sensor. For example, the converted energy may be stored in an electrical charge storage device, such as a capacitor bank, and upon the energy stored in the electrical charge storage device reaching a prescribed level the energy can be used to power the electronic storage device and associated circuitry. Operation (or other) data then can be extracted from the electronic device, converted to an optical signal (e.g., via an LED or the like), and transmitted back to the interrogator for further processing. In this manner, the passive optical sensor becomes a "plug and play" component, without the need for any sensor-specific maintenance once the sensor is installed.

In certain applications, such as explosive environments, it may be desirable to limit the amount of energy stored in the energy storage device. Therefore, the optical sensor may include circuitry that limits the energy stored by the energy storage device below a predefined threshold level.

In accordance with the invention, a measurement system for an aircraft includes an interrogator and an optical sensor assembly, remotely connected to the interrogator. The optical sensor assembly includes an optical sensor connected along a sensor path to the interrogator, a data storage device configured to store operational data, and a control circuit operationally connected to the data storage component, and connected along a power path to the interrogator. The sensor assembly also includes an opto-electric device for converting an optical signal to an electric current, the opto-electric device connected along the power path between the interrogator and the control circuit, to power the data storage component through the control circuit. A transmitter is operationally connected to the control circuit and connected along a data path to the interrogator, to provide operational data along the data path to the interrogator, wherein the data storage component is powered across the power path from the interrogator, and provides operational data to the interrogator across the data path, and the interrogator is configured to receive sensor data from the sensor across the sensor path, and manipulate the data in light of the operational data for analysis of the sensor data.

Referring now in detail to the drawings and initially to FIG. 1, illustrated is a measurement system 10 for measuring a property of a fuel stored in a tank 12 of an aircraft 14. The measurement system 10 includes an interrogator 16 and a passive optical sensor 18 remotely connected to the interrogator 16 via an optical link 20, such as a fiber optic cable or the like. In the exemplary embodiment, the passive optical sensor 18 is arranged within the fuel tank 12 and operative to provide data indicative of a property of the fuel in the tank 14, while the interrogator 16 is located remote from the fuel tank (e.g., in the avionics bay) and communicates with the sensor 18 via the optical link 20.

Figure 2:
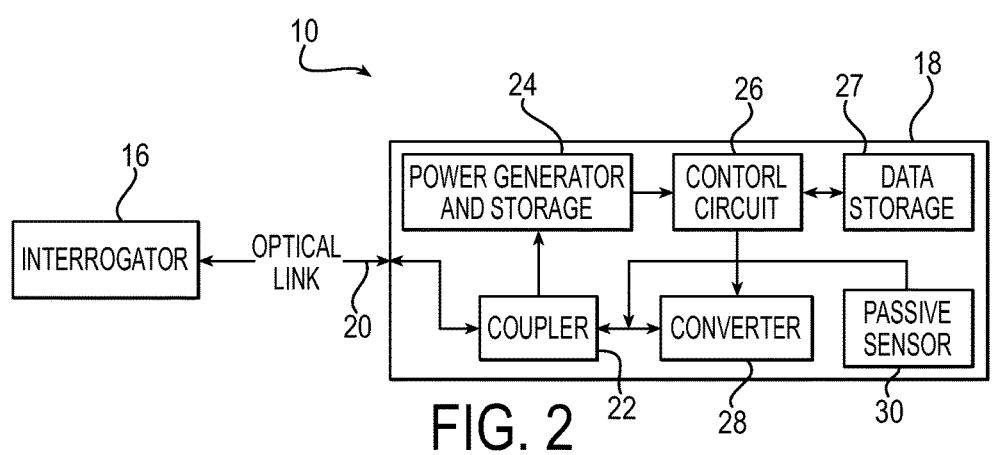
FIG. 2 is a block diagram of an exemplary measurement system in accordance with the present invention.

With additional reference to FIG. 2, a block diagram of an exemplary embodiment of an optical sensor 18 is illustrated. The optical sensor 18 includes an optical coupler 22 for optically coupling between the sensor 18 and the interrogator 16. The coupler 22 is optically coupled to a power generator 24, and at least a portion of an optical signal received from the interrogator 16 is provided to the power generator 24. The power generator 24 includes a conversion device, such as a photodiode that converts the input optical energy into an electrical current. Alternatively, the power generator may be embodied as an LED. Electrically connected to the power generator 24 is a control circuit 26, which in turn is electrically connected to a data storage device 27 that can store operational data. The control circuit 26 may be embodied as a high-efficiency logic circuit and/or processing device, while the data storage device 27 may be embodied as an EEPROM or FRAM device. The data storage device 27 can store critical data relating to the sensor's operation, such as its serial number, calibration data, configuration data, or other data as dictated by the application. Also, while EEPROM and FRAM devices are disclosed, it will be appreciated that other electrical devices may be used without departing from the scope of the invention.

The power generator 24 harvests electric power from the optical signal transmitted by the interrogator 16 and provides the electrical power to the control circuit 26 and the data storage device 27. Upon accumulating sufficient power, the power generator 24 provides power to the control circuit 26 and the data storage device 27 which then become active, and the data stored in the data storage device 27 is retrieved by the control circuit 26 in electrical form.

The control circuit 26 is electrically connected to a converter 28, which receives the data from the control circuit 26 in electrical form and converts it to an optical signal. The converter 28 is optically connected to the coupler 22 and communicates the data (now in optical form) back to the coupler 22, which in turn provides the data back to the interrogator 16 over the optical link 20.

In addition to retrieving operational data, the sensor performs a sensing function, e.g., the sensor operates to collect data regarding a property of the fuel. In this regard, a passive optical sensor 30 collects raw data corresponding to the fuel and provides the data to the coupler 22, which transmits the data to the interrogator 16. The interrogator 16 uses the data retrieved from the storage device 27 along with the raw data collected by the passive sensor 30 to determine a characteristic of the fuel in the tank (e.g., a fuel level).

In the event that the amount of power available instantaneously is too low to power the control circuit 26 and data storage device 27, the power generator 24 and/or the control circuit 26 may include electrical charge storage devices, such as a capacitor bank. The charge storage devices could be charged over a period of time, and, once at a sufficient charge level, used to power the control circuit 26 and data storage device 27 to interrogate the data storage device 27. Optionally, the stored charge also may be used to power an optical transmitter (not shown) for returning the data to the interrogator 16. The control circuit 26 may further include logic that limits the amount of energy stored in the electrical charge storage device below a predetermined threshold level.

The charge accumulation process may be performed in a number of steps in order to transmit the full data set. In configurations where the data need only be read at system power on, this may not be a significant concern as the data would only need to be read at system power on, where time periods of several minutes may be acceptable.

In order to keep the cost of the interrogator system 10 to a minimum, it would be preferable to use the light source for the interrogation of the passive optical sensor 18 to also generate electric power. However, this may limit the choice of opto-electronic components and may limit the amount of available power through constraints around the type of fiber optic cable that is used. If a single fiber optic link is to be used, it is preferable for the return data transmission from the device to the interrogator be accomplished using a distinctly different wavelength of light from that used for the passive optical sensor to prevent cross-talk or interference of its operation.

While aspects of the invention are described using a common (single) optical link 20 for both the sensing aspect and the operation data transmission aspect, multiple optical links may be used. For example, a first optical link may be used to interrogate the sensor (e.g., to send a request to the sensor and to receive a response from the sensor), and a second, separate optical link may be used to provide optical power for conversion to electric power and/or to transmit the operation data. Using a separate fiber optic link for the operation data transmission may lower cost and improve efficiency of the device. More particularly, moving to separate fiber links may allow for a lower cost solution, as widely available and inexpensive components for operation in the visible light spectrum could be coupled with optical links such as Plastic Optical Fiber (POF). Further, if maximum power generation is desired, then power may be harvested from both the first and second optical links.

In addition to or in place of the opto-electronics components discussed above, alternative architectures and components could be used. For example, the input/drive optical wavelength and the return/data optical wavelength could be different. By way of example, the input optical energy may be at 1,300 nm, and the return data may be transmitted in the 850 nm wavelength band.

More particularly, and with reference to FIG. 3, a first opto-electronic device 50 (e.g., a laser or an LED) of the interrogator 16 transmits, via a first optical link 52, an optical signal at a first wavelength (e.g., 1300 nm). The optical signal is received by a coupler in the form of a wavelength division multiplexor (WDM) 54. The WDM directs the optical signal over a single optical link 52a to a Dichroic filter/reflector or WDM 56, and at least a portion of the signal is directed to the power generator 24 via optical link 52b. The power generator 24, which may include a photodiode for converting optical power into electric power and a power supply coupled to the photodiode) harvests electric power from the optical signal and provides the power to control circuit 26 and the data storage device 27, thereby enabling the operational data to be extracted therefrom. The operational data is provided by the control circuit 26 to the converter 28 (e.g., an LED in the exemplary embodiment), which converts the electrical signal back to optical form, for example, at a wavelength different from the original optical signal, e.g., 850 nm. The optical signal then is provided back to the Dichroic filter/reflector or WDM 56 over optical link 52c, and to the WDM 54 via the optical link 52a. The WDM 54 routes the optical signal to a second opto-electronic device 58 (e.g., a photo diode) of the interrogator 16 via optical link 59, thereby enabling the interrogator to process the data collected by the sensor.

An advantage of the embodiment of FIG. 3 is that crosstalk between the signal provided by the interrogator 16 and the response provided by the sensor 30 is minimized. This due to the fact that the two signals are transmitted at different wavelengths.

Further, and as an alternative to using an active data transmission component inside the sensor 18, a modulated reflective device may be used. Such an arrangement could be realized using an LCD or MEMS scanning mirror. For example, a modulated reflective device can be used to modulate incident light on a reflective surface. This modulation can controlled by the control circuit 26 to create a data stream back along the fiber optic link.

For example, and with reference to FIG. 4, an opto-electronic device (e.g., and LED) 60 of the interrogator 16 transmits via an optical link 62a an optical signal at a first wavelength (e.g., 850 nm). The optical signal is provided via the optical link 62a to a coupler in the form of a directional device 63 (e.g., an optical diode or the like that enables signal flow in one direction but prevents signal flow in the opposite direction). The directional device 63, via optical link 62b, then provides the signal to a beam splitter 64 where a portion of the optical signal is directed to the power generator 24 via optical link 62c, and a portion of the optical signal is directed to the converter 30a via optical link 62d. In the exemplary embodiment the beam splitter 64 provides 50% of the optical signal to the power supply and the other 50% to the converter 28a. It will be appreciated, however, that the 50/50 split is merely exemplary and other splits are contemplated without departing from the scope of the invention. The power generator 24, receiving the optical signal via the optical link 62c, harvests electric power from the optical signal and provides the power to control circuit 26 and the data storage device 27, thereby enabling the operational data to be extracted therefrom. The control circuit 26 provides the operational data to the converter 28a, which converts the electrical signal back to optical form.

In the embodiment illustrated in FIG. 4, the converter 28a is not a photodiode or LED as in the previous embodiments, but instead comprises a modulated reflective device 28a having a reflective portion 28a1 and a switching device 28a2, such as an LCD or MEMS scanning mirror, that can be controlled between a transparent state and an opaque state. The switchable device 28a2, which is under the control of the control circuit 26, can control whether or not a portion of the optical signal provided on optical link 62d impinges on the reflective surface 28a1.

Accordingly, the control circuit 26 can modulate a frequency at which the optical signal is reflected back to the interrogator 16. In this manner, the control circuit 26 can encode the operation data stored in the data storage device 27 into an optical signal for transmission back to the interrogator 16. The encoded data, via optical link 62d, is provided to the beam splitter 64 (at a lower power level) where it passes through generally unaltered. The reflected signal then is provided back to an opto-electronic device 66 (e.g., a photodiode) of the interrogator 16 via optical link 62b, directional device 63, and optical link 62e.

An advantage of the embodiment of FIG. 4 is that the incoming optical signal is used for both power generation and for transmission of a reply signal.

Figure 5:
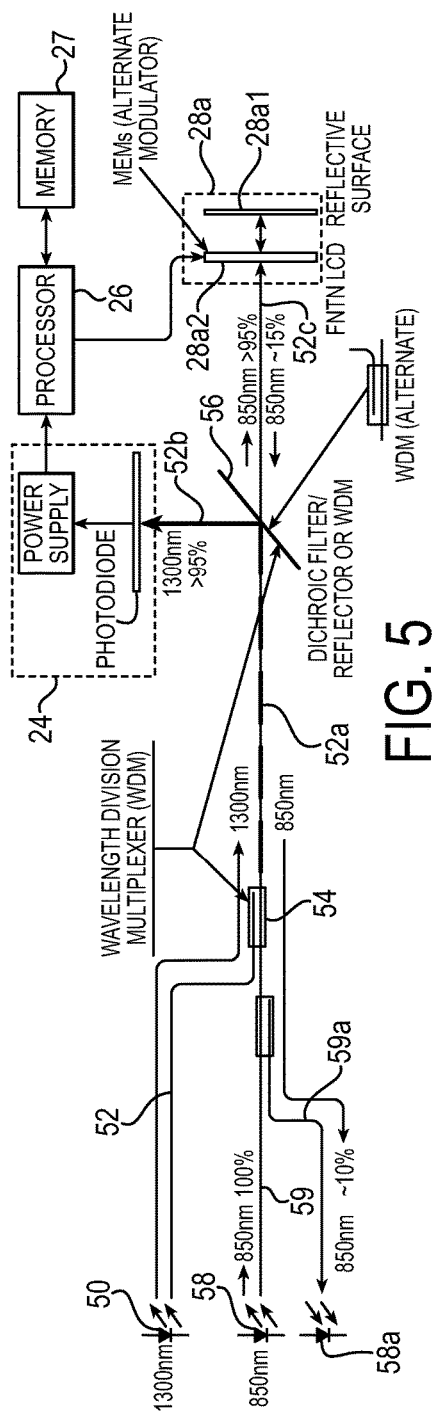
FIG. 5 is a schematic diagram illustrating an exemplary measurement system in accordance with the invention illustrating a combination of the embodiments of FIGS. 3 and 4.

FIG. 5 illustrates a combination of the embodiments illustrated in FIGS. 3 and 4 where two separate optical signals are utilized. In the embodiment of FIG. 5, an opto-electronic device 50 (e.g., a first LED) of the interrogator 16 transmits, via a first optical link 52, an optical signal at a first wavelength (e.g., 1300 nm). The optical signal is received by a wavelength division multiplexor (WDM) 54, which directs the optical signal over a single optical link 52a to a Dichroic filter/reflector or WDM 56, and a majority of the signal is directed to the power generator 24 via optical link 52b. Similarly, a second opto-electronic device 60 (e.g., a second LED) of the interrogator 16 transmits, via a second optical link 59, an optical signal at a second wavelength (e.g., 850 nm). The second optical signal is received by directional device 63 where it is provided via optical link 62b to the wavelength division multiplexor (WDM) 54, which directs the optical signal over a single optical link 52a to the Dichroic filter/reflector or WDM 56, and a majority of the signal is directed to the converter 28a via optical link 52c.

The power generator 24 harvests electric power from the optical signal having a wavelength of 1300 nm and provides the power to control circuit 26 and the data storage device 27, thereby enabling the operation data to be extracted therefrom. The operation data is provided to the converter 28a, which converts the electrical signal back to optical form. In the embodiment of FIG. 5, the converter 28 comprises the modulated reflective device 28a as was described in the embodiment of FIG. 4. However, in this embodiment the second optical signal generated by the second opto-electric device 60 is used by the converter 28a to generate the return signal (e.g., the 850 nm signal in the present example). It is noted that while examples are provided utilizing specific wavelength of light, other wavelengths of light are contemplated as may be required by the specific application.

The encoded optical signal then is provided back to the Dichroic filter/reflector or WDM 56 over optical link 52c, and then to the WDM 54 via the optical link 52a. The WDM 54 routes the optical signal to the directional device 63 which then provides the signal to a third opto-electronic device 66 (e.g., a phototransistor) of the interrogator 16 via optical link 62e.

The embodiment of FIG. 5 includes the advantages of both the embodiments of FIGS. 3 and 4, namely that it minimizes cross talk and the incoming optical signal is used for both power generation and for transmission of a reply signal The power generator 24 can generate power for the control circuit 26 and the data storage device 27 using a visible light LED in the interrogator 16. For example, optical signals using an LED operating in the purple part of the spectrum (380 to 450 nm wavelength) can be transmitted down a Plastic Optical Fiber (POF) link to the power generator 24. The light energy can be harvested from a blue light LED, operating as a photo-detector (approximately in the 450 to 495 nm wavelength range). This energy can be stored locally and built to a sufficient level to power the power generator 24 and/or control circuit 26 (e.g., a small, low-power micro-processor/controller), which in turn can be used to access data in the data storage device 27. Return of the data from the interrogator 16 can be achieved using the same blue light LED to transmit the data down the same POF to the interrogator, where it can be captured and read by a dedicated photo-diode device (Operational Mode).

Alternatively, a separate data return circuit could be built using a red light LED, and a red light photodiode in the interrogator 16. Use of the red light source and photodetector leads to lower power operation, and allows the device to be powered at the same time as returning the data signal down the POF to the interrogator 16. Additionally, the device can be programmed with the data to be stored via the same POF link from the interrogator 16, if desired (Storage Mode).

In such an implementation, the POF may be aligned with the LEDs and photodiodes in each the sensor assembly 18 and the interrogator 16 using free space optics, or it may be implemented using optical path splitters and POF to LED/photodiode junctions. Use of the free space optics route means that, with proper alignment of the fiber end to the opto-electronic components, the cost and size of the device may be minimized.

Figure 6:
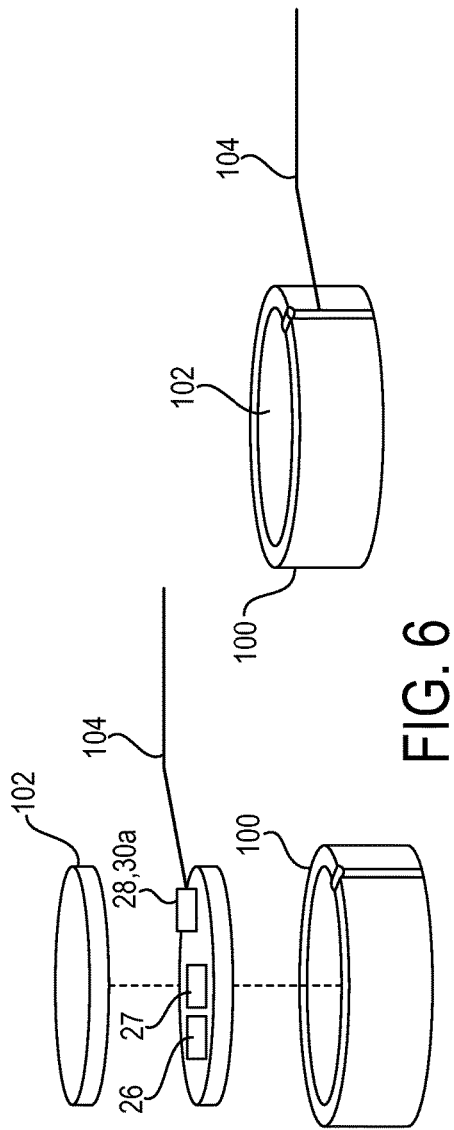
FIG. 6 illustrates an exemplary housing for a sensor assembly in accordance with the invention.

Since the sensor assembly may be placed in harsh environments, it may be necessary to protect the opto-electronics and the electrical circuitry from the environment, particularly from the fuel and other hazardous fluids (e.g., biocides and hydraulic fluids). With reference to FIG. 6, the device can be built in a hermetically sealed housing 100 that allows for the electrical circuit 26, data storage device 27 and the opto-electronics 28, 28a to be potted in place with a fuel resistant epoxy compound 102, leaving the fiber optic 104 exiting the package in a sealed pig-tail configuration. The housing may be a plastic housing made using additive manufacturing techniques using plastic such as Nylon or Ultem. Potting compounds such as 3M DP-190 may be used.

Although the invention has been shown and described with respect to a certain preferred embodiment, it is obvious that equivalent alterations and modifications will occur to others skilled in the art upon the reading and understanding of this specification and the annexed drawings. In particular regard to the various functions performed by the above described components, the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention can have been disclosed with respect to only one of the several embodiments, such feature can be combined with one or more other features of the other embodiments as may be desired and advantageous for any given or particular application.

The invention claimed is:

1. An optical sensor assembly, comprising:
    an optical sensor for obtaining sensor data corresponding to a characteristic to be monitored;
    a data storage device configured to store operation data;
    an opto-electric device for converting an input optical signal to an electric current;
    a control circuit operationally connected the opto-electric device and to the data storage device; and
    a transmitter operationally connected to the control circuit to optically output the operation data stored in the data storage device;
    wherein the data storage device is powered from the opto-electric device, and provides the operation data to the transmitter for optical output of the operation data for manipulation of the sensor data by an external device.

2. The optical sensor assembly according to claim 1, wherein the optical sensor comprises a passive optical sensor.

3. The optical sensor assembly according to claim 2, further comprising an input optical path for receiving optical data from an external device, and at least one of a dichrotic filter, a reflector, a wavelength division multiplexor (WDM), or a beamsplitter arranged between the opto-electric device and the input optical path.

4. The optical sensor assembly according to claim 2, wherein the transmitter comprises a light emitting diode.

5. The optical sensor assembly according to claim 2, wherein the transmitter comprises a modulated reflective device.

6. The optical sensor assembly according to claim 5, wherein the modulated reflective device comprises a liquid crystal display or a micro-electro mechanical system (MEMS) scanning mirror.

7. The optical sensor assembly according to claim 1, wherein the opto-electric device comprises at least one of a light emitting diode or a photodiode.

8. The optical sensor assembly according to claim 1, wherein the optical sensor assembly further comprises a housing, and at least one of the optical sensor, the data storage device, the control circuit, the opto-electric device, or the transmitter are arranged within the housing.

9. The optical sensor assembly according to claim 8, wherein the housing is a hermetically sealed housing.

10. The optical sensor assembly according to claim 1, further comprising an energy storage device configured to store electric energy harvested by the opto-electric device.

11. The optical sensor assembly according to claim 10, further comprising circuitry configured to limit energy stored in the energy storage device below a predetermined threshold level.

12. A measurement system for an aircraft, comprising:
    an interrogator; and
    the optical sensor assembly according to claim 1 remotely connected to the interrogator.

13. The measurement system according to claim 12, further comprising a single fiber optic connection between the interrogator and the optical sensor assembly, wherein both the operation data and the sensor data are communicated over the single fiber optic connection.

14. The measurement system according to claim 12, further comprising a plurality of fiber optic connections between the interrogator and the optical sensor assembly, wherein the operation data is communicated over a first fiber optic connection of the plurality of fiber optic connections and the sensor data is communicated over a second fiber optic connection of the plurality of fiber optic connections.

15. The measurement system according to claim 12, wherein the optical sensor assembly utilizes a first wavelength of light to communicate the sensor data from the optical sensor assembly to the interrogator, and a second wavelength of light to communicate the operation data from the optical sensor assembly to the interrogator, the second wavelength being different from the first wavelength.

16. The measurement system according to claim 12, wherein the interrogator is configured to transmit a first optical signal to the optical sensor assembly at a first wavelength, and the optical sensor assembly is configured to transmit a second optical signal to the interrogator at a second wavelength different from the first wavelength.

17. The measurement system according to claim 16, wherein the first wavelength comprises 1300 nanometers, and the second wavelength comprises 850 nanometers.

18. The measurement system according to claim 12, wherein the interrogator is configured to transmit an optical signal in the visible spectrum.

19. The measurement system according to claim 18, wherein the interrogator is configured to transmit the optical signal to the optical sensor assembly in a violet part of the visible spectrum of light, and the opto-electric device comprises a blue-light LED operative to convert the input optical signal to electric power.

20. The measurement system according to claim 19, wherein the optical sensor assembly is configured to use the blue-light LED to transmit the operation data back to the interrogator.

21. The measurement system according to claim 19, wherein the optical sensor assembly is configured to transmit the operation data to the interrogator over the red spectrum of light.

* * * * *